United States Patent [19]

Kasazumi et al.

[11] Patent Number: 5,225,920
[45] Date of Patent: Jul. 6, 1993

[54] LIQUID CRYSTAL MODULATOR INCLUDING A DIFFUSER WITH PLURAL PHASE SHIFTING REGIONS

[75] Inventors: Kenichi Kasazumi, Takatsuki; Makoto Kato, Nishinomiya; Ikunori Kobayashi, Sakai, all of Japan

[73] Assignee: Matsushita Electric Industrial Co., Ltd., Osaka, Japan

[21] Appl. No.: 680,484

[22] Filed: Apr. 4, 1991

[30] Foreign Application Priority Data

Apr. 6, 1990 [JP] Japan .................................. 2-092429

[51] Int. Cl.⁵ .................. G02F 1/1335; G02F 1/1333
[52] U.S. Cl. ......................................... 359/69; 359/74
[58] Field of Search ....................... 359/69, 48, 62, 74, 359/82, 95

[56] References Cited

U.S. PATENT DOCUMENTS

| | | | |
|---|---|---|---|
| 3,736,047 | 5/1973 | Gelber et al. ........................ | 359/74 X |
| 4,505,547 | 3/1985 | Sekimura et al. ...................... | 359/74 |
| 4,715,686 | 12/1987 | Iwashita et al. ..................... | 359/82 X |
| 5,046,827 | 9/1991 | Frost et al. ............................ | 359/54 |
| 5,148,302 | 9/1992 | Nagano et al. .................... | 359/82 X |

FOREIGN PATENT DOCUMENTS 1-254990  11/1989  Japan .
1-302376  12/1989  Japan .

*Primary Examiner*—William L. Sikes
*Assistant Examiner*—Ron Trice
*Attorney, Agent, or Firm*—Panitch Schwarze Jacobs & Nadel

[57] ABSTRACT

Light emitted from a coherent light source undergoes fine adjustment of its polarizing direction by a polarizing device and is directed to a liquid crystal device through a collimating optical system. The polarizing device is capable of fine-adjusting the polarizing direction in accordance with the wavelength of the incident light, thereby providing a high contrast ratio. When an image is recorded by holography using such a liquid crystal spacial light modulator, it is possible to obtain an image of high quality.

9 Claims, 6 Drawing Sheets

Fig. 3a
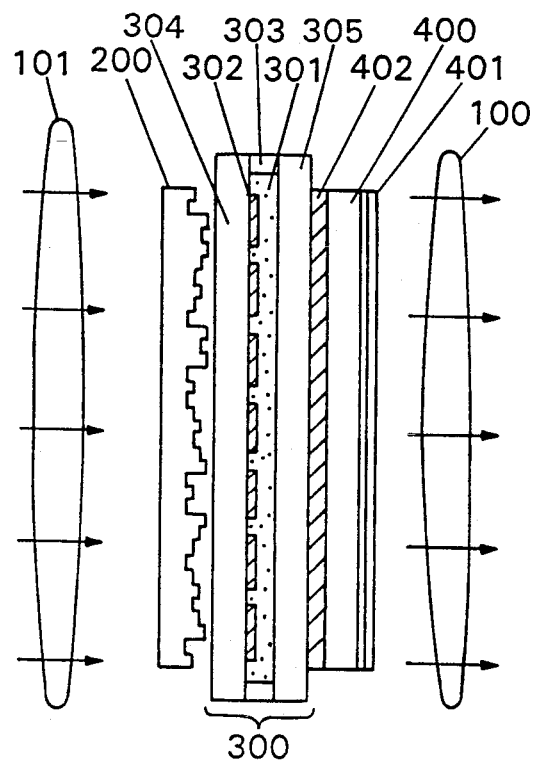
Fig. 3b
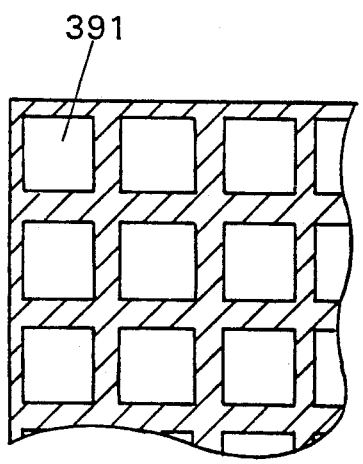
Fig. 3c
| 204 | 202 | 205 | 203 | 206 | | | | |
|---|---|---|---|---|---|---|---|---|
| π/2 | 0 | π/2 | π | 3π/2 | π | π/2 | 0 | π/2 | 0 |
| 0 | 3π/2 | 0 | π/2 | π | π/2 | π | 3π/2 | π | 3π/2 |
| 3π/2 | 0 | π/2 | π | 3π/2 | 0 | π/2 | π | 3π/2 | π |
| π | π/2 | π | π/2 | 0 | 3π/2 | 0 | π/2 | 0 | π/2 |
| π/2 | π | π/2 | 0 | 3π/2 | 0 | 3π/2 | π | 3π/2 | π |
| 0 | π/2 | π | 3π/2 | 0 | π/2 | π | π/2 | π | π/2 |
| 3π/2 | 0 | π/2 | π | 3π/2 | π | π/2 | π | 3π/2 | 0 |
| 0 | π/2 | π | 3π/2 | 0 | 3π/2 | π | π/2 | 0 | π/2 |
| 3π/2 | 0 | 3π/2 | π | 3π/2 | 0 | 3π/2 | π | π/2 | π |
| 0 | π/2 | π | π/2 | | | | π/2 | π | |
(201, 207, 208, 209 labels on left)

Fig. 3d

| | | | | | | | | | |
|---|---|---|---|---|---|---|---|---|---|
| $\pi/3$ | 0 | $\pi/3$ | $2\pi/3$ | 0 | $2\pi/3$ | $\pi/3$ | 0 | $\pi/3$ | 0 |
| 0 | $2\pi/3$ | 0 | $\pi/3$ | $2\pi/3$ | $\pi/3$ | $2\pi/3$ | $\pi/3$ | 0 | $\pi/3$ |
| $2\pi/3$ | 0 | $\pi/3$ | $2\pi/3$ | 0 | $2\pi/3$ | $\pi/3$ | $2\pi/3$ | $\pi/3$ | 0 |
| $\pi/3$ | $2\pi/3$ | 0 | $\pi/3$ | $2\pi/3$ | $\pi/3$ | 0 | $\pi/3$ | $2\pi/3$ | $\pi/3$ |
| 0 | $\pi/3$ | $2\pi/3$ | 0 | $\pi/3$ | 0 | $2\pi/3$ | 0 | $\pi/3$ | $2\pi/3$ |
| $2\pi/3$ | 0 | $\pi/3$ | $2\pi/3$ | 0 | $2\pi/3$ | $\pi/3$ | $2\pi/3$ | 0 | $\pi/3$ |
| $\pi/3$ | $2\pi/3$ | 0 | $\pi/3$ | $2\pi/3$ | $\pi/3$ | 0 | $\pi/3$ | $2\pi/3$ | 0 |
| 0 | $\pi/3$ | $2\pi/3$ | 0 | $\pi/3$ | 0 | $2\pi/3$ | 0 | $\pi/3$ | $2\pi/3$ |
| $2\pi/3$ | 0 | $\pi/3$ | $2\pi/3$ | 0 | $2\pi/3$ | $\pi/3$ | $2\pi/3$ | 0 | $\pi/3$ |

Labels: 201, 207, 208, 209 (rows); 204, 202, 205, 206, 203 (columns)

LIQUID CRYSTAL MODULATOR INCLUDING A DIFFUSER WITH PLURAL PHASE SHIFTING REGIONS

BACKGROUND OF THE INVENTION

1. Field of the Invention:

The present invention relates to a liquid crystal spacial light modulator used in display panels, image information recording, etc., and to a holographic image information recording apparatus using the same.

2. Description of the Prior Art:

Researches on image information recording and reproduction techniques using holography have been under way since the 1960s. Especially, three-dimensional information recording and reproduction apparatus have recently begun to attract attention from the fields of medicine, art, etc. as the application value of such apparatus is recognized. Active matrix liquid crystal display (LCD) panels, for use in portable TV, projection-TV, etc., using twisted nematic liquid crystals have also been actively developed, and high performance, high resolution products have begun to be marketed. Under these circumstances, the holographic image recording system has been proposed which uses an LCD panel as the spacial light modulator (SLM) and displays a computer-processed image on the liquid crystal SLM to produce object light.

In the holographic image recording system, the performance of the liquid crystal SLM plays an important part in determining the quality of recorded images. Besides, anti-noise measures are an essential requirement, which is not the case with conventional LCD panels illuminated with incoherent light. To specifically describe the measures, it is required to suppress speckle noise, interference noise, etc., which are caused as a result of the illumination of the liquid crystal SLM by coherent light.

In a conventional LCD panel, as shown in FIG. 1, polarizing plates 2a and 2b are respectively attached to the front and back surfaces of a liquid crystal device 1. Light emitted from a light source 10 is passed through a lens 20, a pinhole 23, and a lens 21, and is polarized by the polarizing plates 2a and 2b in the rectilinear direction coinciding with the anchoring direction of the liquid crystal device 1. The liquid crystal device 1 rotates the direction of polarization of the incident light to modulate the intensity of the outgoing light emitted through the polarizing plate 2b on the back side. However, such a construction is disadvantageous in that the performance, including the contrast ratio, of the liquid crystal device 1 cannot be fully utilized, being restricted by the performance of the polarizing plates 2a and 2b.

To describe in detail, the polarizing plates have the shortcomings in that the light transmittance is low, and that the extinction ratio is relatively low, and that the polarizing direction is not uniform but dispersed within the surface. Furthermore, there is a possibility that the polarizing direction may slightly deviate from the proper angle because of an error in attaching the polarizing plates to the liquid crystal device. As a result, the contrast ratio of the SLM is reduced. Another factor contributing to the reduced contrast ratio is the inability to obtain the proper polarizing direction for incident light other than that of a particular wavelength because the proper polarizing direction with the liquid crystal device 1 varies depending on the wavelength of the light entering the SLM. As a result, the contrast ratio of the SLM is reduced.

Further, in the conventional LCD panel, film-like polarizers are used. The problem is that the light is reflected on the surface of the polarizers, thus generating interference noise. To prevent the reflection of light, an anti-reflection film can be provided on the surface of the polarizer, but it is difficult to provide a durable anti-reflection film on the surface of a film-like polarizer.

For the above reasons, in order to obtain a high quality image using a liquid crystal SLM, it is necessary to adjust the polarizing direction of the incident light without providing a polarizer on the front side of the liquid crystal panel. To achieve this purpose, it is possible to collimate the linearly polarized light from a laser light source for direct entry to the liquid crystal device, but in such a construction, if the laser light source itself is to be rotated through a minute angle for fine adjustment of the polarizing direction of the laser beam, a relatively large-sized mechanism will be required for the rotation of the laser light source. On the other hand, a mirror may be used so as to reduce the size of the entire optical system, but the light reflected by a mirror generally becomes elliptically polarized and is therefore not desirable. Furthermore, when the liquid crystal SLM is applied to holography, the problem is that the reference light separated from the object light by a half mirror also becomes elliptically polarized. Thus, in the liquid crystal SLM, it is not easy to properly design an optical system capable of fine-adjusting the polarizing direction of the incident light.

SUMMARY OF THE INVENTION

The liquid crystal spacial light modulator of the present invention, which overcomes the above-discussed and other numerous disadvantages and deficiencies of the prior art, comprises a coherent light source; a polarizing device capable of fine-adjusting the polarizing direction of the light emitted from the coherent light; a collimating optical system into which the light with its polarizing direction adjusted by the polarizing device is introduced; and a liquid crystal device into which the light passing through the collimating optical system is introduced for transmission therethrough and which modulates the intensity of the transmitting light in accordance with image data.

In an embodiment, a polarizing plate is provided on the back light side of the liquid crystal device.

In an embodiment, a diffuser having phase shift regions arranged at a prescribed pitch is disposed on the front side of the liquid crystal device, a plurality of phase shift regions of the diffuser being arranged in a manner to correspond to one pixel of the liquid crystal device. The phase shift regions of the diffuser is (0, $\pi/2$, $\pi$, $3\pi/2$) or (0, $\pi/3$, $2\pi/3$).

In an embodiment, an anti-reflection plate is provided on the back side of the liquid crystal device. The anti-reflection plate consists of a transparent plate whose front and back surfaces are parallel to each other and an anti-reflection film attached in a contacting relationship to the back surface of the transparent plate, the anti-reflection plate being disposed in such a way that the back surface of the transparent plate is parallel to the back surface of the liquid crystal device. Alternatively, the anti-reflection plate consists of a transparent plate whose back surface is slanted with respect to the front surface thereof, the anti-reflection plate being disposed in such a way that the back surface thereof is slanted with respect to the back surface of the liquid crystal device. Alternatively, the anti-reflection plate consists of a transparent plate whose front and back surfaces are parallel to each other, the anti-reflection plate being disposed in such a way that the back surface thereof is slanted with respect to the back surface of the liquid crystal device.

The holographic image information recording apparatus of the present invention comprises a coherent light source; a beam splitter that splits the light from the coherent light source into two beams, an object beam and a reference beam; a polarizing device capable of fine-adjusting the polarizing direction of the object beam separated by the beam splitter; a collimating optical system into which the object beam with its polarizing direction adjusted by the polarizing device is introduced; a liquid crystal device into which the object beam passed through the collimating optical system is introduced for transmission therethrough and which modulates the polarization of the transmitting beam in accordance with image data; and an interference optical system which causes the light emitted from the liquid crystal device to interfere with the reference beam separated by the beam splitter; and a means for recording the light produced as a result of the interference by the interference optical system.

In an embodiment, the holographic image information recording apparatus further comprises a polarizing device for fine-adjusting the polarizing direction of the reference beam separated by the beam splitter.

Thus, the invention described herein makes possible the following objectives.

The polarizing plate previously provided on the incident side of the liquid crystal SLM is replaced by a polarizing device which is provided in the path of the light entering the liquid crystal device and which is capable of fine-adjusting the polarizing direction. This serves to eliminate the problem associated with an error in attaching the polarizing plate. a problem inherent in the prior art liquid crystal SLM. Moreover, since the polarizing direction can be adjusted according to the wavelength of the incident light, a high contrast ratio can be constantly obtained even when the wavelength of the incident light varies. Furthermore, since the polarizing device is provided on the incident side of the collimating optical system, it is only necessary for the polarizing device to have a transmitting face of the order of a few mm in diameter, which allows the use of a polarizing device, such as a Gran-Thompson prism, which has a high transmittance and a high distinction ratio. Thus, according to the present invention, holographic image recording with good image quality can be performed without providing a polarizer on the back side required in the conventional liquid crystal SLM.

BRIEF DESCRIPTION OF THE DRAWINGS

This invention may be better understood and its numerous objects and advantages will become apparent to those skilled in the art by reference to the accompanying drawings as follows:

FIG. 3a is a sectional view showing a portion of another liquid crystal SLM of the present invention in which a diffuser is attached in a contacting relationship to the front side of a liquid crystal device, and FIGS. 3b and 3c, respectively are schematic diagrams showing the configuration of the liquid crystal device and phase deviation regions of the diffuser. FIG. 3d is a schematic diagram of the phase deviation regions of the diffuser according to a $\pi/3$ relationship.

DESCRIPTION OF THE PREFERRED EMBODIMENTS

EXAMPLE 1

Figure 2:
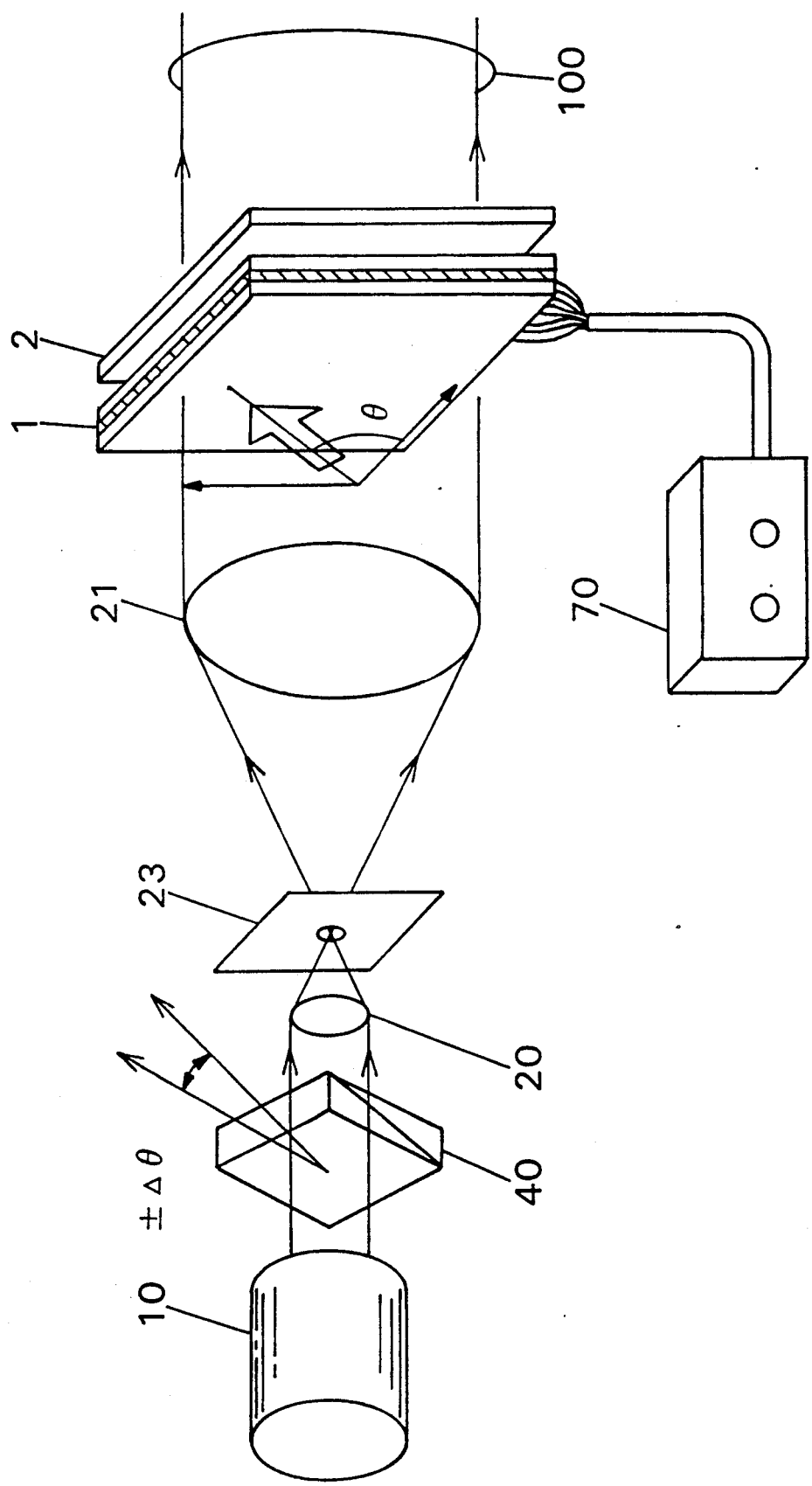
FIG. 2 is a schematic diagram showing a liquid crystal SLM of the present invention.

FIG. 2 shows the construction of a liquid crystal SLM using a TN liquid crystal device of the present invention. Light emitted from a coherent light source 10 passes through a polarizing device 40 and enters a collimating system consisting of a lens 20, a pinhole 23 and a lens 21. The collimating system enlarges the incident light and directs it to a TN liquid crystal device 1. The TN liquid crystal device 1 works to modulate the polarization of the transmitting light in accordance with the image information supplied from a pattern generator 70. The light with modulated polarization passes through a polarizing plate 2 and is emitted as spacially modulated light 100.

Figure 1:
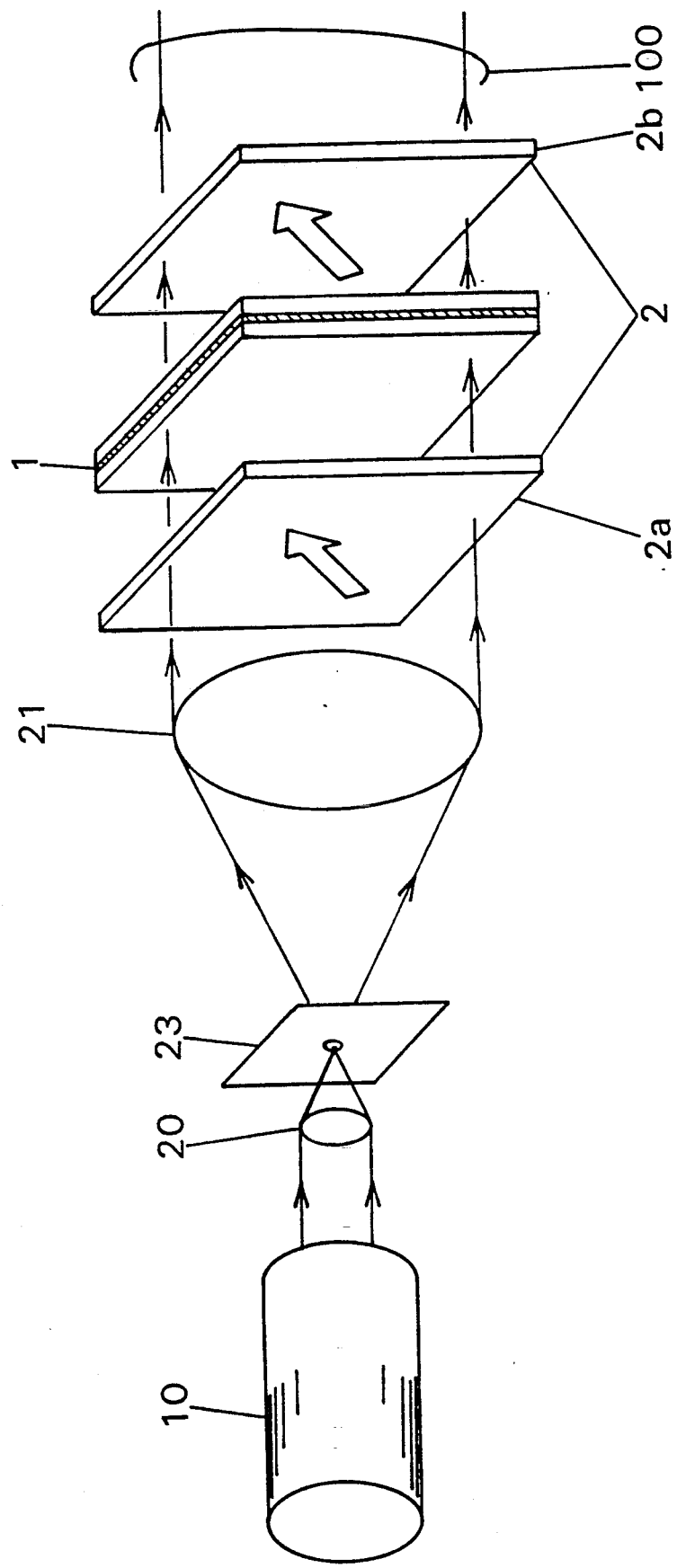
FIG. 1 is a schematic diagram of a conventional liquid crystal SLM using two polarizing plates.

The important point in the above-mentioned construction is that when a device, such as a Gran-Thomson prism, having a high distinction ratio is used as the polarizing device 40, a further complete linearly polarized light can be obtained and also the polarizing direction of the light can be changed as desired. As a result, the polarizing direction is almost uniform within the surface of the polarizing device 40 as compared with the conventional liquid crystal SLM using polarizing plates shown in FIG. 1, so that the plane-polarized light that contains fewer unwanted components of polarization enters the liquid crystal device 1. resulting in a spacially modulated light 100 with a high contrast ratio. Furthermore, since the polarizing direction can be adjusted according to the wavelength of the incident light, it is possible to constantly obtain a high contrast ratio regardless of the variation in the wavelength of the light emitted from the light source.

The contrast ratio was measured with a liquid crystal SLM having the construction of FIG. 2. A He-Ne laser of a wavelength 633 nm was used as the light source 10, and a Gran-Thomson prism mounted on a rotating stage was used as the polarizing device 40. Light emitted from the light source 10 was polarized by the polarizing device 40 so that the polarizing direction thereof coincided with the anchoring direction of the liquid crystal device 1. The light passing through the polarizing device 40 was directed through the lens 20, pinhole 23 and lens 21 of the collimating system to enter the liquid crystal device 1 perpendicularly, and the light transmitted through the liquid crystal device 1 was emitted as the spacially modulated light 100 through the polarizing plate 2. Then, while monitoring on an optical power meter the power of the light transmitted through an area of about $30 \times 30$ mm$^2$ of the liquid crystal device 1, the angles of the polarizing device 40 and the polarizing plate 2 were readjusted so that the light transmission was at its minimum when no voltage was applied to the liquid crystal device 1. In this situation, the transmittance of the liquid crystal device 1 was measured. The results are shown in Table 1. In the conventional liquid crystal SLM with a polarizing plate attached to the front side of the liquid crystal device, the contrast ratio is of the order of several tens even when a plane-polarized laser light is used. On the other hand, in the liquid crystal SLM of the present invention, a high contrast ratio of over 600 (ratio of maximum to minimum transmittance, 140/0.23 > 600) was obtained.

TABLE 1

| Applied voltage (mV) | Transmitted light power (UW) | Transmitted light power ratio |
| --- | --- | --- |
| 0 | 0.23 | 1 |
| 195 | 3.48 | 15 |
| 400 | 55.0 | 239 |
| 610 | 110.3 | 480 |
| 920 | 140 | 609 |

EXAMPLE 2

Example 1 discloses a liquid crystal SLM designed for production of an image of high contrast ratio, but for holographic recording of a higher image quality, it is necessary to suppress speckle noise generated from the coherent optical system. For that purpose, a practical holographic recording system requires, as shown in FIG. 3, the provision of a diffuser 200 on the front side of a TN liquid crystal device 300.

In this embodiment, the diffuser 200 is brought into contact with a glass plate 304 of the liquid crystal device 300 into which a collimated laser beam 101 is introduced. In the liquid crystal device 300, the glass plate 304 having cell electrodes that is disposed on the front side of the liquid crystal device 300, is disposed at an appropriate space from a glass plate 305 that is disposed on the back side, by means of a spacer 303, and the space is charged with a TN liquid crystal 301. The glass plate 305 on the back side of the liquid crystal device 300 is provided with an anti-reflection plate. The anti-reflection plate comprises a glass plate 400, which is a transparent plate whose front and back surfaces are parallel to each other, and an anti-reflection film 401 attached to the back surface of the glass plate 400, and the glass plate 400 is attached to the glass plate 305 on the back side of the liquid crystal device 300, by means of a matching liquid 402 having a refractive index equal to that of the glass plates 400 and 305. The spacially modulated light 100 is emitted through the anti-reflection film 401.

The diffuser 200 is a glass plate having a pattern of protrusions and recesses formed at a prescribed pitch on one surface thereof to give a prescribed pseudo-random phase distribution to the light entering in the form of a plane wave. The amount of phase shift is determined by the depth of the said uneven pattern formed on the surface of the diffuser 200, each pattern area forming a phase shift region. The phase distribution given to the transmitting light by the diffuser 200 is determined by the pitch of the phase shift regions and the amount of phase shift at each phase shift region; for example, a four-level pseudo-random phase system is used. In the four-level pseudo-random phase system, the incident light is subjected to any one of four phase shift, 0, $\pi/2$, $\pi$, or $3\pi/2$ at any phase shift region, the phase shift between adjacent phase shift regions being $\pi/2$.

FIG. 3b shows the pixel configuration of the liquid crystal device 300, and FIG. 3c shows the phase distribution on the diffuser 200 corresponding to the pixel configuration of the liquid crystal device 300. The diffuser 200 and the liquid crystal device 300 are drawn on the same scale, nine phase shift regions, 201, 202, 203, . . . , 209 corresponding to one pixel 391 of the liquid crystal device. As described above, each phase shift region 201-209 provides any one of the four phase shift levels, 0, $\pi/2$, $\pi$, or $3\pi/2$ to the incident light, the phase difference between adjacent phase deviation regions being $\pi/2$.

Alternatively, the pseudo-random phase system can be so configured as to provide three phase shift levels, 0, $\pi/3$, and $2\pi/3$, to the incident light, with a $\pi/3$ phase difference between adjacent phase shift regions (see FIG. 3d).

By using the diffuser 200 of the above-mentioned construction, the spacially modulated light emitted from the liquid crystal SLM is diffused, thereby achieving holographic image recording of high quality with little speckle noise. If the diffuser 200 is not provided, holographic recording can still be performed by slightly deviating the photographic plate from the focal point of a Fourier-transform lens, but in this case, the coherent light having almost planar wavefronts and striking the liquid crystal SLM interferes with the scattered light produced by dust and other particles adhering to the lens, etc., thereby generating concentric speckle noise. In contrast, when the diffuser 200 is provided, almost no interference noise patterns appear on the spacialy modulated light 100 by the particles adhering to the lens, etc. because the coherent light undergoes a phase shift at the same pitch as that of the protrusions and recesses (the pitch of the phase shift regions) formed on the diffuser 200. In this case, even though the coherent light diffused by the diffuser 200 interferes with the scattered light, the noise pattern produced by the interference is a pattern with a fine pitch equivalent to the pitch of the protrusions and recessed formed on the diffuser 200. Therefore, when the pitch of the protrusions and recesses on the diffuser 200 is made sufficiently smaller than the size of the pixel 391 of the liquid crystal device 300, the noise pattern can be suppressed to a negligible level. As a result, an image of higher quality and better S/N ratio can be obtained in image recording when the phase shift regions are provided at a high density on the diffuser 200 than when they are provided one each corresponding to one pixel 391 of the liquid crystal device 300. Another advantage of using the high density diffuser is that moire fringes produced by the diffuser 200 and the liquid crystal device 300 are less likely to occur, which facilitates the positional alignment of the diffuser 200 with respect to the liquid crystal device 300.

Moreover, in the liquid crystal SLM of the present embodiment, an anti-reflection plate is disposed on the surface of the glass plate 305 placed on the front side of the liquid crystal device 300. The anti-reflection plate comprises a glass plate 400 with an anti-reflection film 401 attached thereto. The glass plate 400 is in contact with the glass plate 305 of the liquid crystal device 300 with a matching liquid 402 interposed therebetween. This serves to suppress the Fresnel reflection at the back surface of the liquid crystal device 300, thereby reducing the interference fringes to be superimposed on the output image.

The above description has illustrated how the improvement in image recording can be achieved by the provision of the diffuser 200 and the anti-reflection arrangement on the back surface of the liquid crystal device 300. To verify the effect of the diffuser 200, we measured the S/N ratio of the image produced by the liquid crystal SLM shown in FIG. 3. A TN liquid crystal panel (pixel pitch of about 90 μm) for a projection TV was used as the liquid crystal device 300, and the diffuser 200 having phase shift regions with a pitch of about 15 μm was attached in a contacting relationship to the incident light surface of the liquid crystal device 300. For comparison, a diffuser having phase shift regions with a pitch of about 90 μm was attached to the front surface of the liquid crystal device of another liquid crystal SLM. The reconstructed image from holograms recorded with each liquid crystal SLM was focused through the lens system onto the CCD element, and the output signal from the CCD was converted from analog to digital to measure and compare the S/N ratios of images produced by the respective liquid crystal SLMs having different pitches of phase shift regions. We defined the S/N ratio as the ratio of the standard deviation of fluctuation $\sigma$ of the output light intensity to the average image intensity I when a consistent white image was input to the liquid crystal SLM. The result was that the S/N ratio of the reconstructed image was 26 dB with the 15 μm-pitch diffuser, while the S/N ratio of the reconstructed image was 20 dB with the 90 μm-pitch diffuser. This means that the S/N ratio was improved by 6 dB by reducing the pitch of the phase shift regions of the diffuser to 1/6. Also, the output image of sufficiently high quality was obtained by installing the diffuser in a contacting relationship to the liquid crystal device.

EXAMPLES 3 and 4

Figure 4A:
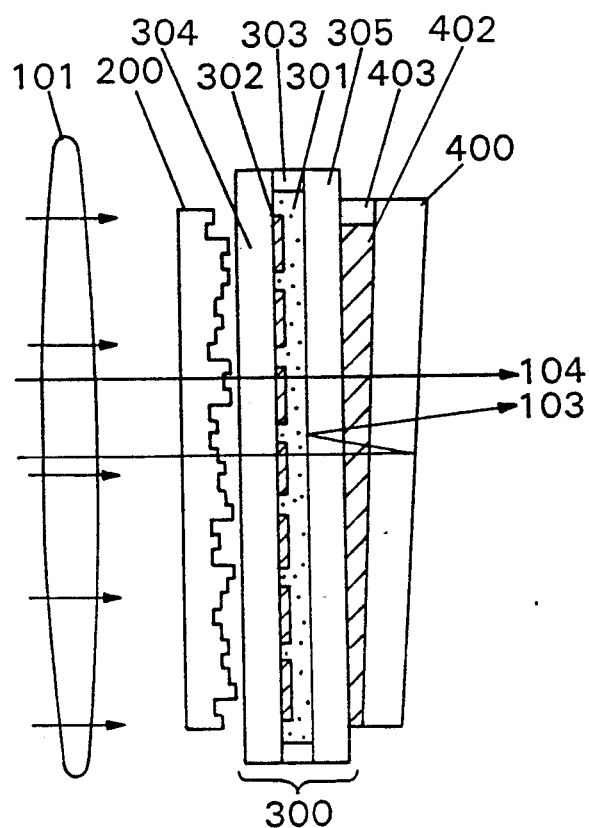
FIGS. 4a and 4b, respectively are sectional views showing an anti-reflection plate of another liquid crystal SLM of the present invention.
Figure 4B:
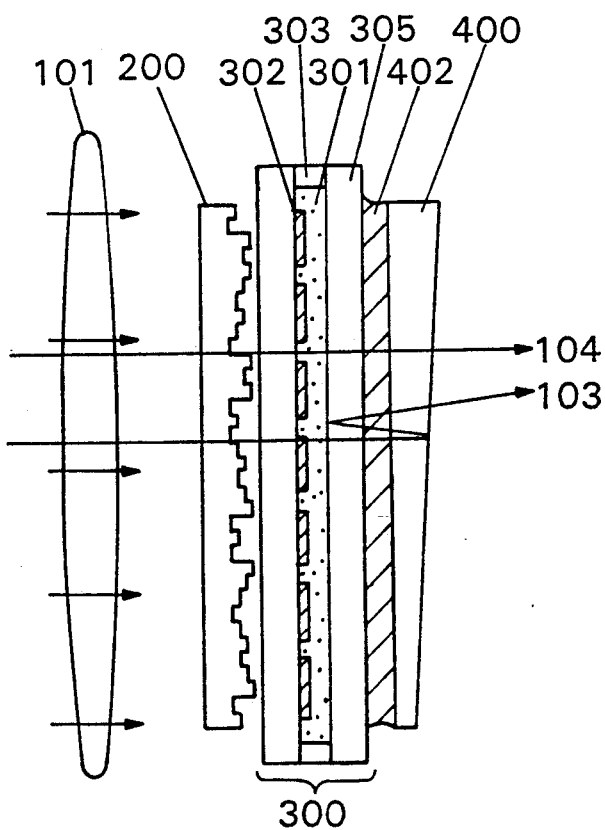

FIGS. 4a and 4b, respectively, show other examples of the anti-reflection plate to be provided on the back surface of the liquid crystal device 300. The embodiment shown in FIG. 4a uses as the anti-reflection plate, a glass plate 400 of a constant thickness, whose front and back surfaces are parallel to each other, with no anti-reflection film attached on the back surface thereof. Using a matching liquid 402, the glass plate 400 is attached to back surface of the liquid crystal device 300, in a manner to slant at an angle greater than a prescribed angle with respect to the back surface of the liquid crystal device 300. In this case, a spacer 403 is provided between the glass plate 400 and the glass plate 305 on the back side of the liquid crystal device 300 to provide a prescribed slanting angle to the glass plate 400.

In the embodiment of FIG. 4b, a glass plate 400 having wedge-shaped cross section with its back surface slanted with respect to its front surface is attached to the glass plate 305 on the back side of the liquid crystal device 300 by using a matching liquid 402, the back surface of the glass plate 400 being slanted with respect to the back surface of the liquid crystal device 1.

In either embodiment, the Fresnel reflection at the back surface of the glass plate 400 is not reduced, but the optical axes of reflected light 103 and transmitted light 104 are shifted from each other. Therefore, by determining the slanting angle of the back surface of the glass plate 400 so that the optical axes are shifted by an angle greater than a specific angle, it is possible to sufficiently reduce the spacial frequency of interference fringes occurring in the outgoing light, thereby preventing the deterioration of the final image produced.

EXAMPLE 5

Figure 5:
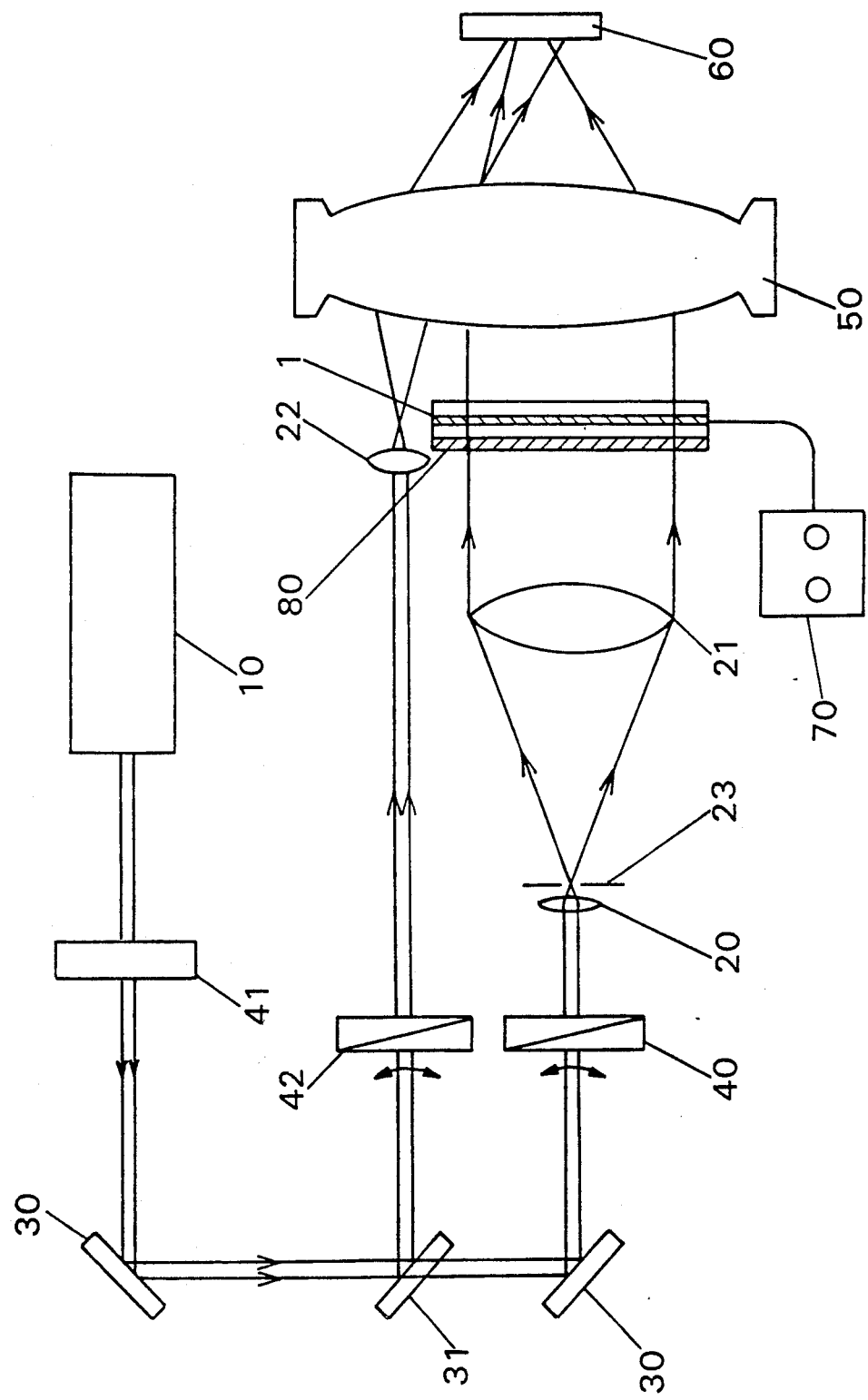
FIG. 5 is a schematic diagram showing a holographic image information recording apparatus of the present invention.

FIG. 5 shows a holographic image recording optical system which uses the liquid crystal SLM of the present invention. Light emitted from a light source 10 is passed through a shutter 41 and is directed to a half mirror 31 acting as a beam splitter. The light directed at the half mirror 31 and reflected by it is used as a reference beam, which is directed to a polarizing device 42 and then enters a Fourier-transform lens 50 after passing through the polarizing device 42 and a lens 22. The light allowed to pass through the half mirror 31 is used as an object beam, which is directed to the liquid crystal SLM. In the liquid crystal SLM of the present embodiment, a diffuser 80 is provided on the front surface of a TN liquid crystal device 1, and the light transmitted through the half mirror 31 is passed through a polarizing device 40 of the liquid crystal SLM and is directed at a collimating system consisting of a lens 20, a pinhole 23, and a lens 21. The object beam passed through the collimating system enters the liquid crystal device 1 through the diffuser 80. The liquid crystal device 1 is driven in accordance with image data supplied from a pattern generator 70, to spacially modulate the object beam passing through the liquid crystal device 1. The object beam passing through the liquid crystal device 1 enters the Fourier-transform lens 50. Interference occurs between the object beam and the reference beam also entering the Fourier-transform lens 50, thereby forming an interference pattern on a photographic plate 60.

The holographic image recording optical system shown in FIG. 5 uses the Fourier-transform lens 50 as the interference optical system in consideration of the suitability for high density image recording, but other interference optical systems can also be used depending upon the recording and reproduction method employed; for example, a cylindrical lens can be used for holographic stereogram recording.

The thus constructed holographic image recording optical system of the present invention is characterized, among others, by the provision of the polarizing device 40. In the conventional holographic image recording optical system, the construction is such that polarizing plates are disposed on the front and back sides of the liquid crystal device 1 or that a rotatable polarizer is disposed on the back side of the SLM. The former construction has had problems with contrast ratio, etc. as previously mentioned. On the other hand, the latter construction has required the provision of a polarizer having an aperture size equal to or larger than the image area of the SLM and has also had problems in terms of the maximum contrast ratio, because the outgoing light from the SLM becomes elliptically polarized when the wavelength of the light emitted from the light source varies. According to the construction of the holographic image recording optical system of the present invention, since the polarizing device 40 is provided, there is no need to provide a polarizing plate on the front side of the liquid crystal device 1, and the outgoing light from the SLM is provided with a high contrast ratio. Moreover, since the polarizing device 42 is provided in the light path of the reference beam, the reference beam, elliptically polarized by the half mirror, can be polarized back to the plane-polarized light, so that an interference pattern of good visibility can be obtained.

Another advantage of the holographic image recording optical system of the present invention is that there is also no need to provide a polarizing plate on the back side of the liquid crystal device 1. When a polarizing plate is provided on the back side of the liquid crystal device, the intensity of the outgoing light from the SLM is modulated, but when such a polarizer is not provided, the outgoing light has its polarizing direction phase-modulated. This results in the generation of components whose polarizing direction is perpendicular to the reference beam, but in this case, only bias components are applied to the interference pattern on the photographic plate, as compared with the case when the polarizing plate is provided, and the interference pattern shape remains unaffected. Moreover, since the polarizing plate is not provided, an almost constant exposure amount can be obtained regardless of the pattern shape, and accordingly an excellent holographic recording can be performed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid crystal spacial light modulator comprising:
    a coherent light source;
    a polarizing device capable of fine-adjusting the polarizing direction of the light emitted from the coherent light source;
    a collimating optical system into which the light with its polarizing direction adjusted by the polarizing device is introduced;
    a liquid crystal device into which the light passing through the collimating optical system is introduced for transmission therethrough and which modulates the intensity of the transmitting light in accordance with image data; and
    a diffuser which has a plurality of phase shift regions arranged at a prescribed pitch and is disposed on an incident light side of the liquid crystal device, at least two of the plurality of phase shift regions of the diffuser being arranged in a manner to correspond to one pixel of the liquid crystal device.

2. A liquid crystal spacial light modulator according to claim 1, wherein a polarizing plate is provided on an outgoing light side of the liquid crystal device.

3. A liquid crystal spacial light modulator according to claim 1, wherein the phase retardation of the phase shift regions of the diffuser is 0, $\pi/2$, $\pi$ or $3\pi/2$, and the phase difference between adjacent phase shift regions of the diffuser is $\pi/2$.

4. A liquid crystal spacial light modulator according to claim 1, wherein the phase retardation of the phase shift regions of the diffuser is 0, $\pi/3$ or $2\pi/3$, and the phase difference between adjacent phase shift regions of the diffuser is $\pi/3$.

5. A liquid crystal spacial light modulator according to claim 1, wherein a glass plate with anti-reflection coating on an outgoing light surface thereof is provided on an outgoing light side of the liquid crystal device.

6. A liquid crystal spacial light modulator according to claim 1, wherein a glass plate is provided on an outgoing light surface of the liquid crystal device, the glass plate consisting of a transparent plate having an outgoing light surface and an incident light surface, the outgoing light surface of the transparent plate being slanted with respect to the incident light surface thereof, and the glass plate being disposed so that the outgoing light surface thereof is slanted with respect to the outgoing light surface of the liquid crystal device.

7. A liquid crystal spacial light modulator according to claim 1, wherein a glass plate is provided on an outgoing light surface of the liquid crystal device, the glass plate consisting of a transparent plate having an outgoing light surface and an incident light surface, the incident light and outgoing light surfaces of the transparent plate being parallel to each other, and the glass plate being disposed so that the outgoing light surface thereof is slanted with respect to the outgoing light surface of the liquid crystal device.

8. A liquid crystal spacial light modulator comprising:
    a coherent light source;
    a polarizing device capable of fine-adjusting the polarizing direction of the light emitted from the coherent light source;
    a collimating optical system into which the light with its polarizing direction adjusted by the polarizing device is introduced;
    a liquid crystal device into which the light passing through the collimating optical system is introduced for transmission therethrough and which modulates the intensity of the transmitting light in accordance with image data; and
    a diffuser which has a plurality of phase shift regions arranged at a prescribed pitch and is disposed on an incident light side of the liquid crystal device, at least two of the plurality of phase shift regions of the diffuser being arranged in a manner to correspond to one pixel of the liquid crystal device;
    wherein a glass plate with anti-reflection coating on an outgoing light surface of the glass plate is provided on an outgoing light side of the liquid crystal device, the glass plate consisting of a transparent plate having an outgoing light surface and an incident light surface, the outgoing light surface of the transparent plate being slanted with respect to the incident light surface of the transparent plate, and the glass plate being disposed so that the outgoing light surface of the glass plate is slanted with respect to the outgoing light surface of the liquid crystal device.

9. A liquid crystal spacial light modulator comprising:
    a coherent light source;
    a polarizing device capable of fine-adjusting the polarizing direction of the light emitted from the coherent light source;
    a collimating optical system into which the light with its polarizing direction adjusted by the polarizing device is introduced;
    a liquid crystal device into which the light passing through the collimating optical system is introduced for transmission therethrough and which modulates the intensity of the transmitting light in accordance with image data; and
    a diffuser which has a plurality of phase shift regions arranged at a prescribed pitch and is disposed on an incident light side of the liquid crystal device, at least two of the plurality of phase shift regions of the diffuser being arranged in a manner to correspond to one pixel of the liquid crystal device;

wherein a glass plate with anti-reflecting coating on an outgoing light surface of the glass plate is provided on an outgoing light side of the liquid crystal device, the glass plate consisting of a transparent plate having an outgoing light surface and an incident light surface, the incident light and outgoing light surfaces of the transparent plate being parallel to each other, and the glass plate being disposed so that the outgoing light surface of the glass plate is slanted with respect to the outgoing light surface of the liquid crystal device.

* * * * *